Oct. 24, 1950           L. B. GREEN           2,527,412
STRETCH BENDING APPARATUS HAVING A RECIPROCATING DIE
AND PIVOTED SIDE SHAPING AND WORK GRIPPING MEANS
Filed Sept. 10, 1946           9 Sheets-Sheet 1

INVENTOR.
LEE B. GREEN
BY
Kwis, Hudson, Boughton & Williams
ATTORNEYS

Oct. 24, 1950 L. B. GREEN 2,527,412
STRETCH BENDING APPARATUS HAVING A RECIPROCATING DIE
AND PIVOTED SIDE SHAPING AND WORK GRIPPING MEANS
Filed Sept. 10, 1946 9 Sheets-Sheet 5

INVENTOR.
LEE B. GREEN
BY
Kwis, Hudson, Boughton & Williams
ATTORNEYS

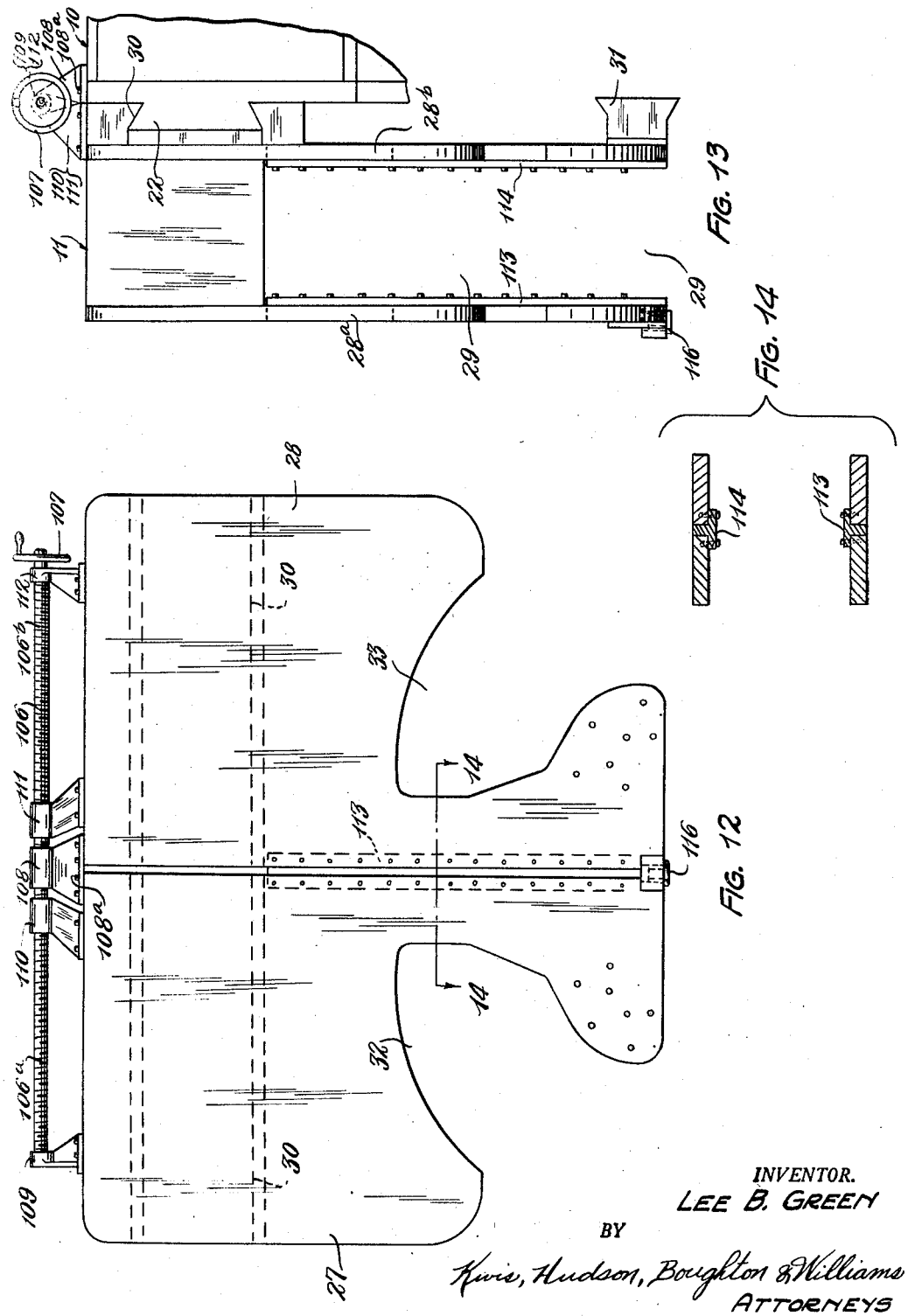

Oct. 24, 1950 L. B. GREEN 2,527,412
STRETCH BENDING APPARATUS HAVING A RECIPROCATING DIE
AND PIVOTED SIDE SHAPING AND WORK GRIPPING MEANS
Filed Sept. 10, 1946 9 Sheets-Sheet 9

INVENTOR.
LEE B. GREEN
BY
Kwis, Hudson, Boughton & Williams
ATTORNEYS

Patented Oct. 24, 1950

2,527,412

UNITED STATES PATENT OFFICE 2,527,412

STRETCH BENDING APPARATUS HAVING A RECIPROCATING DIE AND PIVOTED SIDE SHAPING AND WORK GRIPPING MEANS

Lee B. Green, Lakewood, Ohio

Application September 10, 1946, Serial No. 695,932

15 Claims. (Cl. 153—33)

This invention relates to metal working and, as one of its objects, aims to provide an improved method and machine by which the forming of a workpiece to a desired curved shape is accomplished by a combined stretching and bending operation. The invention is useful for carrying out such a combined stretching and bending operation on a substantially flat workpiece but is especially applicable to workpieces having a transversely curved or channel-like cross-sectional shape and makes possible a rapid and accurate forming of the latter type of workpiece to a desired curved shape without buckling or wrinkling of the material.

Another object of the present invention is to provide an improved metal bending machine for the accomplishment of so-called "stretch bending" operations and in which a rocker member (or members) having work-gripping means thereon cooperates with a die member having a curved anvil portion (or portions) thereon.

Another object of the invention is to provide an improved bending machine of this character, in which the work-gripping means and the die member are adapted to cooperate with a workpiece having an initial transverse curvature or channel-like cross-sectional shape.

Still another object is to provide an improved bending machine of the character mentioned, having wings mounted for swinging movement and in which the rocker members are operatively connected with the wings for actuation thereby and are adapted to travel around the curved anvil portions of the die member for stretching and bending the workpiece therearound.

A further object of the invention is to provide an improved bending machine of this kind in which rack elements of the rocker members mesh with and are rockable on fixed gear sectors during the travel of the rocker members around the curved anvil portions of the die member.

Still another object of this invention is to provide an improved bending machine of the character mentioned, in which the rocker members have spaced sides and are disposed in spanning relation to the curved anvil portions of the die member and in which the work-gripping means comprises chucks located between such spaced sides.

As another of its objects this invention provides an improved bending machine of this character, in which pressure rollers are carried by the wings and act on the rocker members so as to cause the desired working travel of the latter around the curved anvil portions of the die member.

It is also an object of the present invention to provide a novel construction and mounting for the work-gripping devices of the rocker members.

Still another object is to provide a novel form of frame construction for a bending machine of this kind by which increased rigidity and range of operation are obtained and in which a working space for the die and rocker members is made available between certain walls of the frame.

A further object is to provide such an improved bending machine in which the die member carrying the curved anvil portions is movable into and out of the working space and is actuated in timed relation to the swinging of the wings.

The invention can be further briefly summarized as consisting in certain novel combinations and arrangements of parts hereinafter described and particularly set out in the claims hereof.

In the accompanying sheets of drawings

Fig. 12 is a front elevational view of the auxiliary frame of the machine as seen in detached relation.

Fig. 13 is a side or edge view of the auxiliary frame.

Fig. 14 is a transverse sectional view taken through the auxiliary frame on line 14—14 of Fig. 12.

Fig. 15 is a detail sectional elevation taken through a frame reinforcing or holding means as indicated by line 15—15 of Fig. 4.

Fig. 16 is a perspective view showing the shape of the workpiece before the stretch bending operation is performed thereon.

Fig. 17 is a sectional detail view showing a modified form of a work-gripping chuck.

Figure 2:
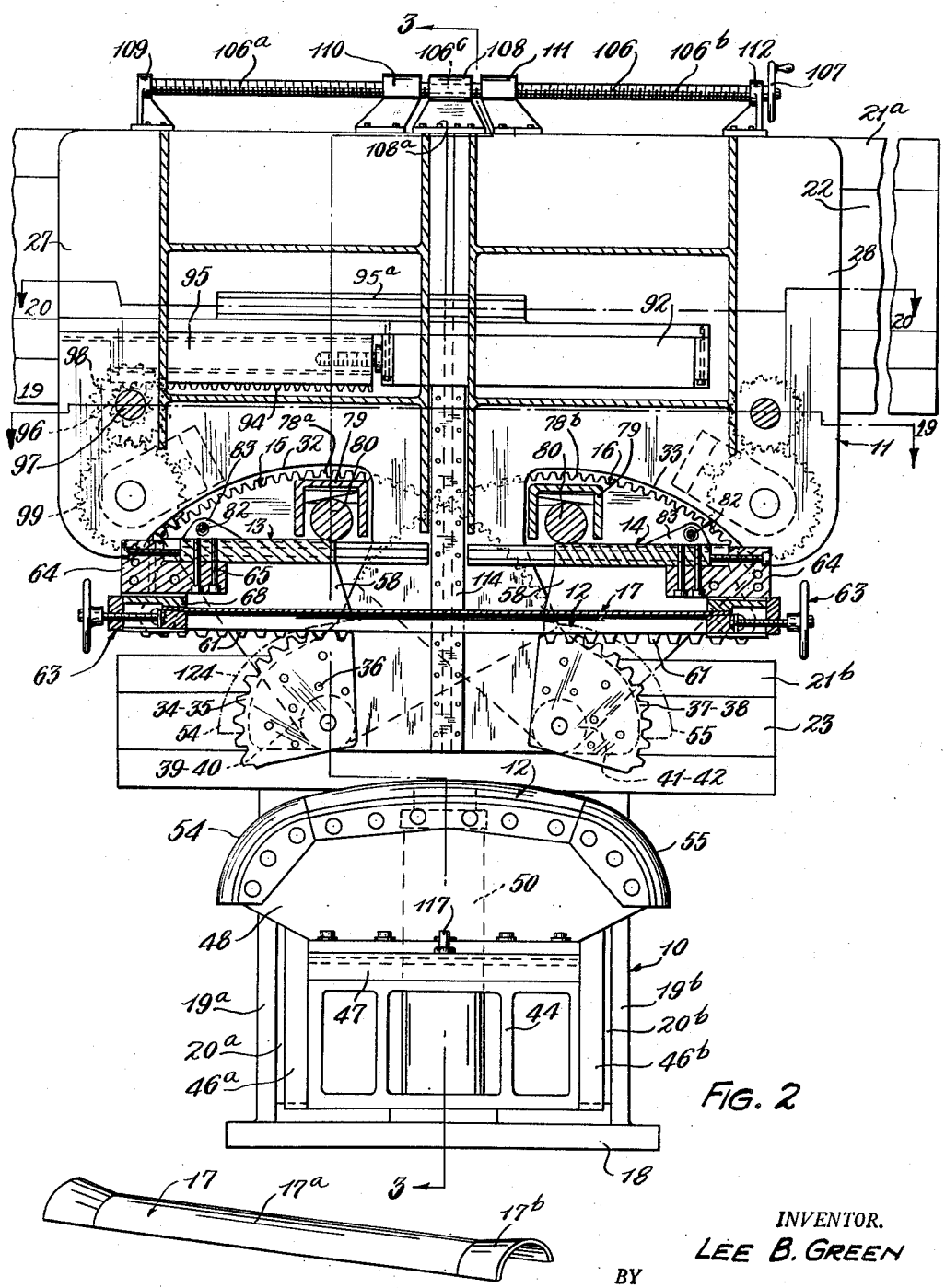
Fig. 2 is a front elevation of the machine viewed as indicated by line 2—2 of Fig. 3 and with the upper portion of the machine shown in section.
Figure 3:
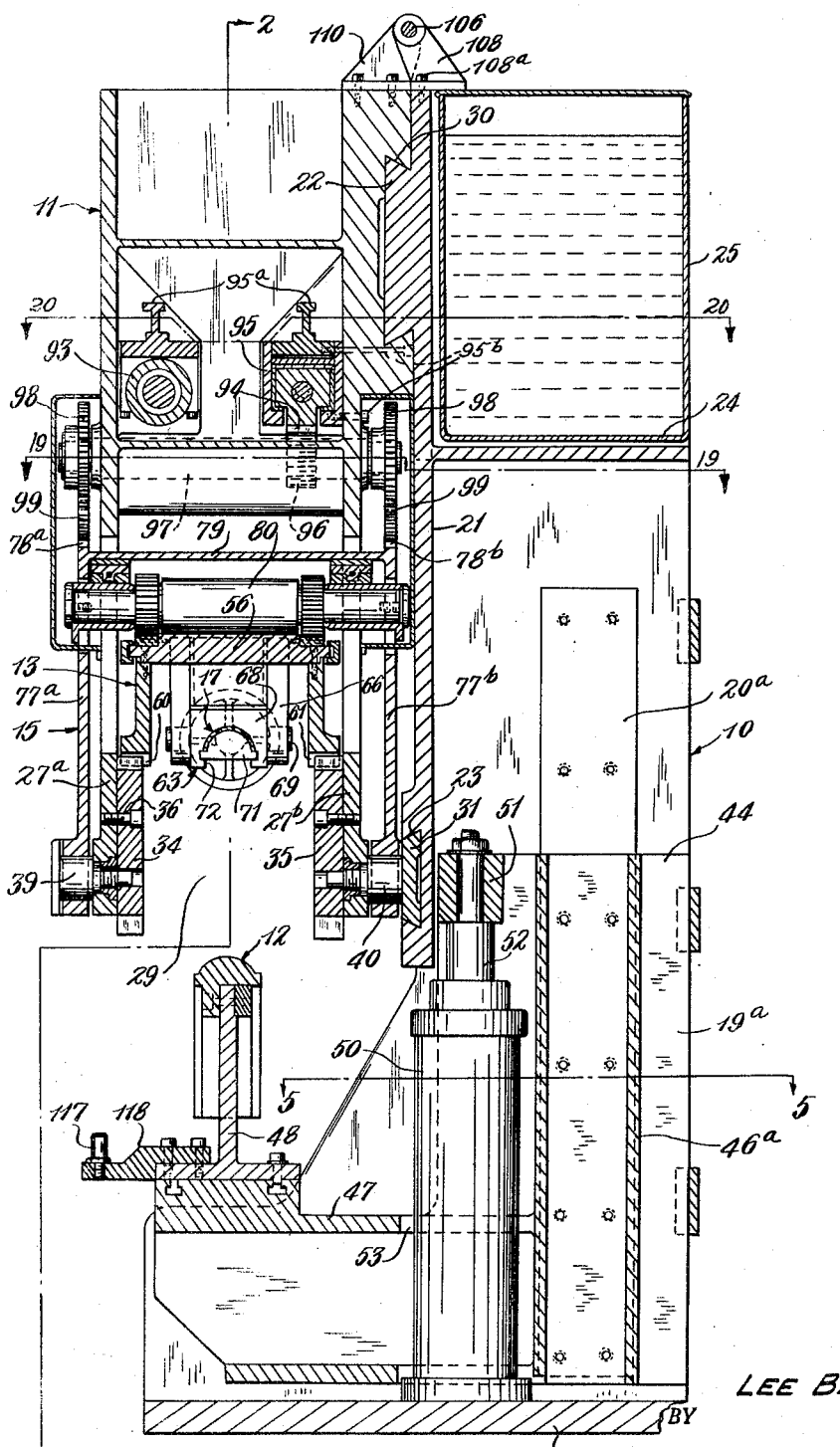
Fig. 3 is a vertical sectional view taken through the machine on line 3—3 of Fig. 2.
Figure 19:
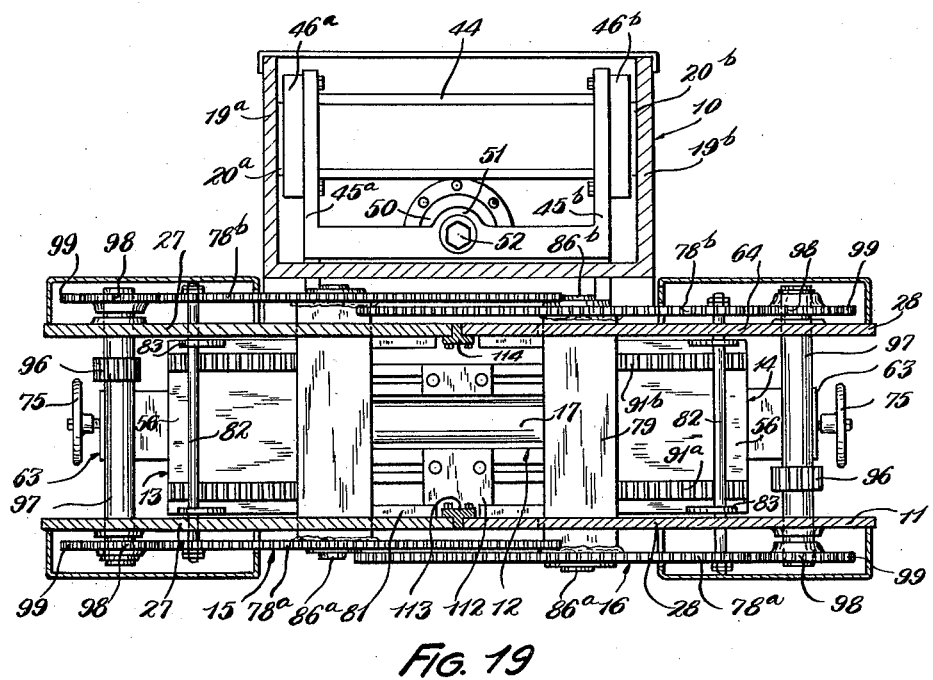
Figure 20:
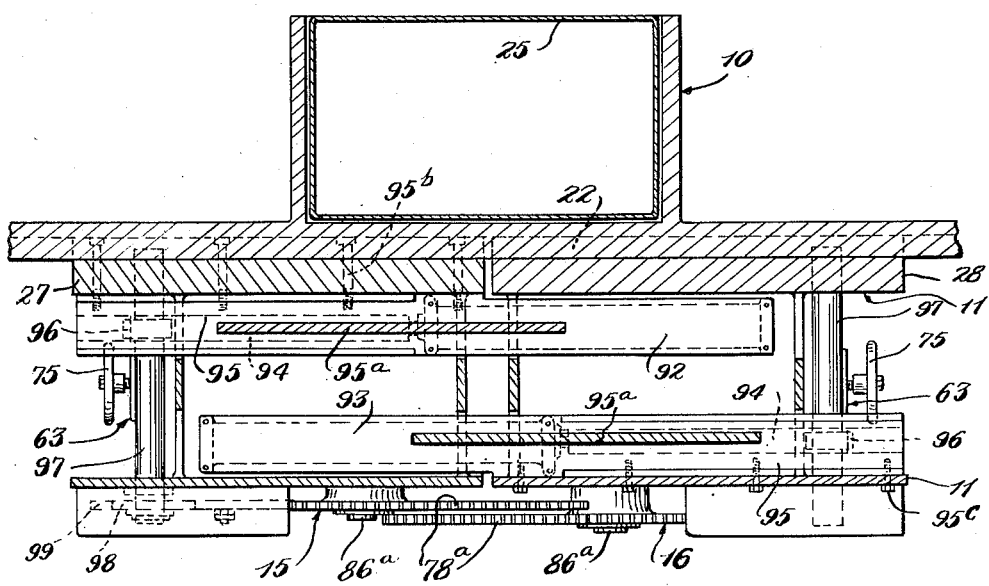

Fig. 18 is another detail view, partly in section, and showing another modified form of work-gripping chuck, Fig. 19 is a transverse section taken through the machine as indicated by section line 19—19 of Figs. 2 and 3, and Fig. 20 is another transverse section taken through the machine on section line 20—20 of Figs. 2 and 3.

The embodiment of the improved bending machine which is illustrated in the drawings comprises in general main frame 10, an auxiliary frame 11, a die member 12 supported by the main frame, a pair of rocker members 13 and 14 supported by the auxiliary frame for cooperation with the die member and a pair of swinging wings 15 and 16 for actuating the rocker members.

This machine is intended for use in forming a metal workpiece, such as a sheet metal strip, to a desired curved shape by a combined stretching and bending operation and, as mentioned above, is especially suitable for performing this operation on workpieces of the type having an initial transversely curved or channel-like cross-sectional shape. By way of example, Fig. 16 shows a workpiece 17 of this type and other views of the drawings show this workpiece being subjected to the stretching and bending operation. The workpiece 17 as here shown is an elongated sheet metal member which has been preformed to a transversely curved shape. The intermediate portion 17a which constitutes the major portion of the length of the workpiece is substantially straight longitudinally thereof. The ends 17b of the workpiece are flared or tapered and have their small radius ends integrally connected with the intermediate portion 17a. The tapered end portions 17b are provided on the workpiece to enable the same to be gripped for the purpose of carrying out the stretching and bending operation thereon as is explained in detail hereinafter.

*Main frame structure*

Figure 1:
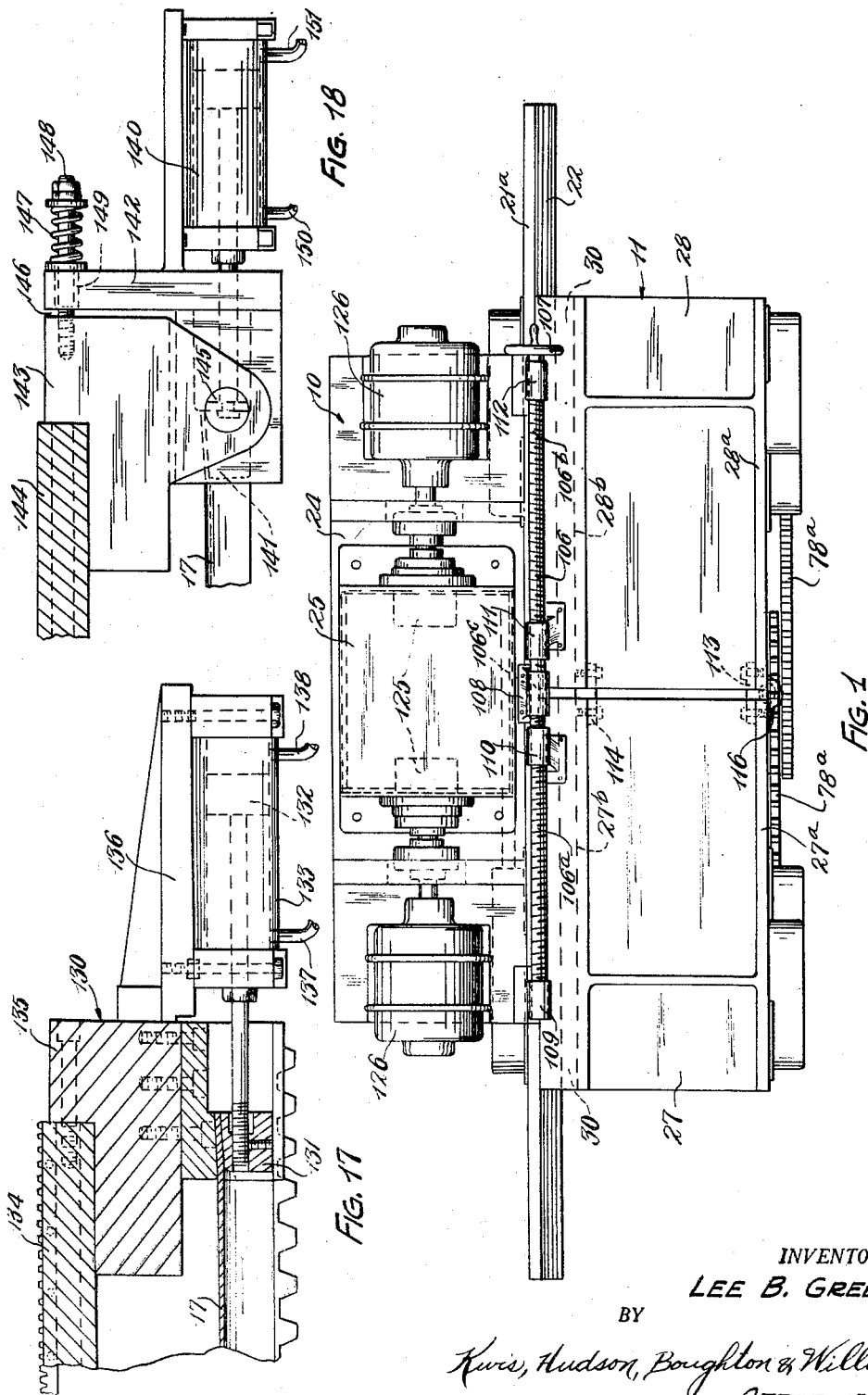
Fig. 1 is a top plan view of a bending machine embodying this invention.
Figure 5:
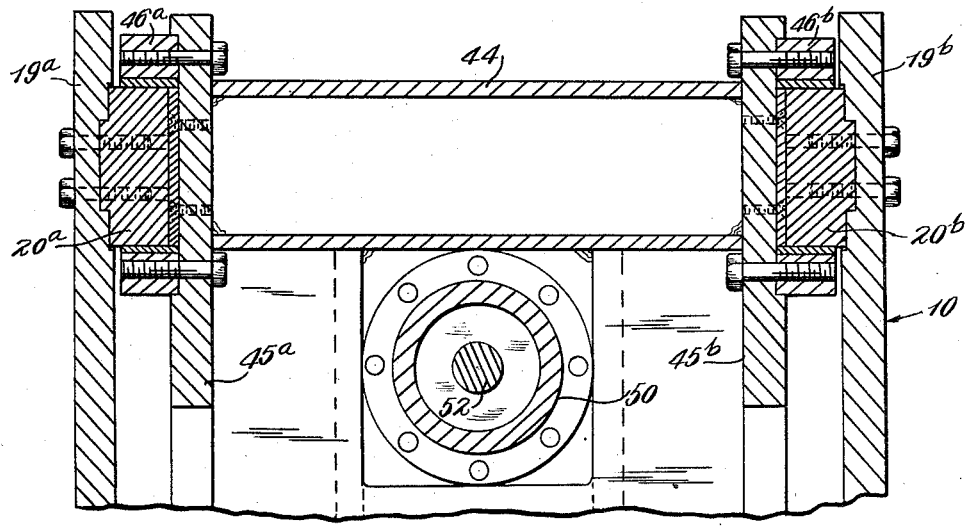
Fig. 5 is a partial transverse sectional view taken through the machine on line 5—5 of Fig. 3.

The main frame 10 comprises an upright rigid structure having a lower portion embodying a base 18 on which the machine is adapted to stand. The lower portion of the main frame also includes substantially parallel upright side walls 19a and 19b (see Figs. 2, 3 and 5) carrying upright guide members 20a and 20b on their adjacent faces. The upper portion of the main frame is provided with a generally flat front wall 21 which includes substantially parallel vertically spaced cross members 21a and 21b (see Figs. 1 and 2) formed integral with such front wall and carrying laterally extending guide and guideway elements 22 and 23. The upper element 22 is a dove-tail shaped guide projection or rib extending laterally across the front face of the cross member 21a and the lower element 23 is a dove-tail shaped groove or guideway cut in the front face of the cross member 21b and extending laterally thereacross in substantially parallel relation to the guide projection 22. The upper portion of the main frame 10 is also provided with a horizonal wall or shelf 24 which supports a reservoir 25 containing oil or other suitable fluid for hydraulic motive purposes described hereinafter.

*Auxiliary frame*

The auxiliary frame 11 is supported by the upper portion of the main frame 10 and comprises a pair of laterally aligned complemental frame sections 27 and 28. As shown in Figs. 12 and 13, each of these frame sections includes a pair of substantially parallel front and back walls which are spaced apart so as to define a working space 29 therebetween. The front and back walls of the frame section 27 are designated 27a and 27b and the corresponding front and back walls of the section 28 are designated 28a and 28b. The frame section 27 and 28 are mounted on the main frame 10 by being provided with vertically spaced laterally extending guideway and guide elements 30 and 31 which cooperate respectively with the guide and guideway elements 22 and 23 of the main frame.

The upper element 30 is a dove-tail shaped guide groove and each of the frame sections 27 and 28 has one of these grooves formed in the rear face of the back wall thereon. The lower guide element 31 is a dove-tail shaped guide projection and each of the frame sections 27 and 28 has one of these projections on the rear face of its back wall. The guide grooves 30 and the guide projections 31 of the two frame sections 27 and 28 are in lateral alignment so that the dove-tail shaped guide projection 22 of the main frame engages in the grooves 30 and the projections 31 engage in the guide groove 23 of the main frame as shown in Fig. 3. An important feature of the frame sections 27 and 28 is that they are provided with recesses 32 and 33 which extend thereinto from the outer edges of their parallel walls and which accommodate the wings 15 and 16 during the swinging thereof as will be further explained hereinafter. The recesses 32 and 33 are here shown as being arcuate and as being of the same size and shape for both the front and rear walls of the frame sections 27 and 28.

At a point adjacent the recess 32 the frame section 27 is provided with a pair of front and back gear sectors 34 and 35 which are fixed thereon as by means of the screws 36 so as to lie against the adjacent faces of the front and back walls 27a and 27b of this frame section. The frame section 28 is provided with a similar pair of gear sectors 37 and 38 which are located adjacent the recess 33 and are fixed against the adjacent faces of the front and back walls 28a and 28b of this frame section. The frame section 27 is also provided with a pair of front and back pivot members 39 and 40 which are mounted thereon adjacent the recess 32 and which project in opposite directions, that is, forwardly and rearwardly from the outer faces of the front and back walls 27a and 27b. The frame section 28 is provided with a similar pair of forwardly and rearwardly projecting pivot members 41 and 42 at a point adjacent the recess 33. The teeth of the gear sectors 34 and 35 are substantially concentrically disposed relative to the pivot members 39 and 40 and the teeth of the gear sectors 37 and 38 are substantially concentrically disposed relative to the pivot members 41 and 42.

*Die slide or carrier*

Figure 4:
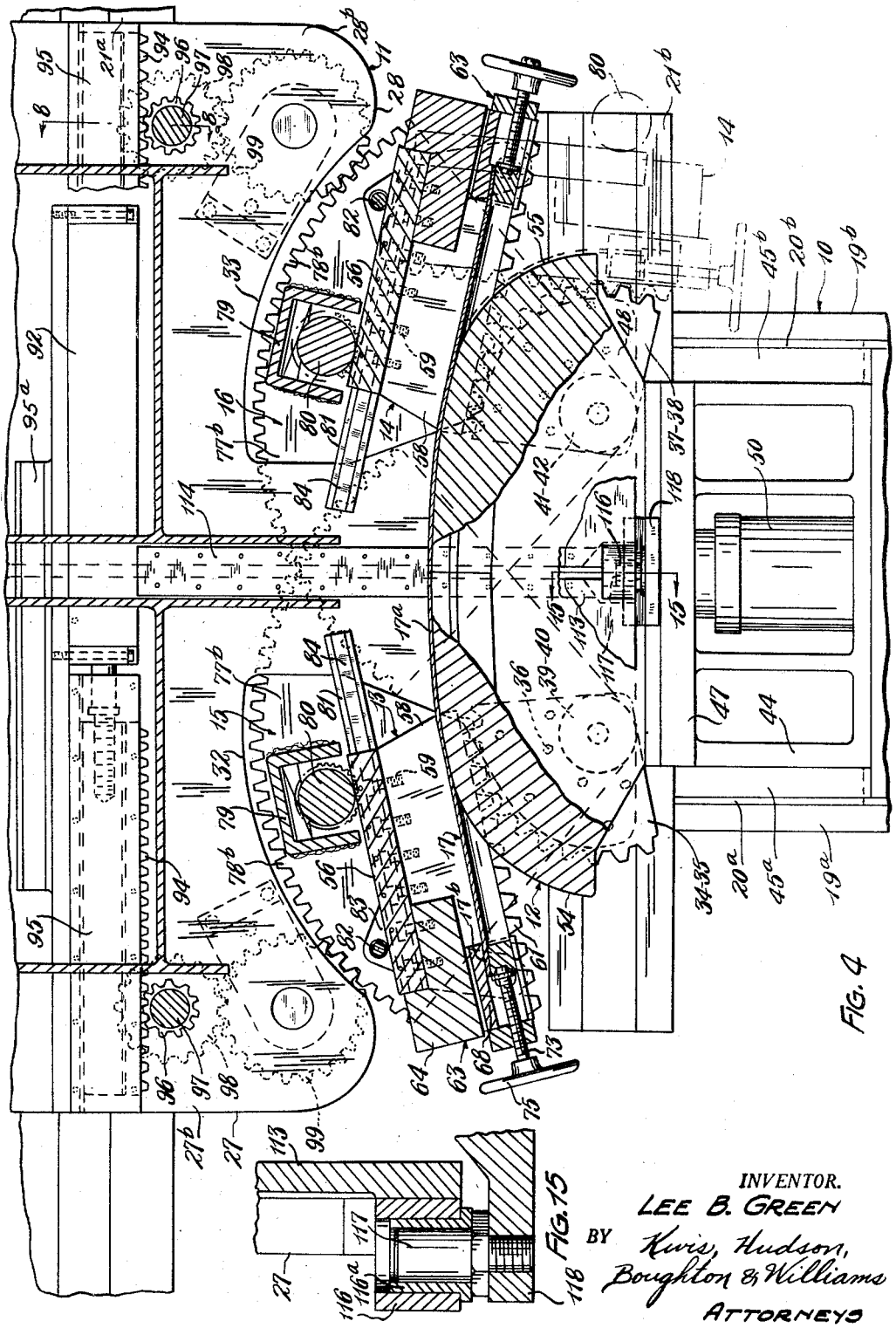
Fig. 4 is a partial front view with portions of the machine shown in section and illustrating the cooperation of the die member and rocker members on a larger scale.

The die member 12 is movable relative to the auxiliary frame 11 and for this purpose is mounted on a carrier or die slide 44. The die slide 44 has laterally spaced upright walls 45a and 45b which are provided on their outer faces with upright guideways 46a and 46b which slidably operate on the stationary guide members 20a and 20b of the main frame 10. The die slide 44 is also provided with a forwardly extending integral shelf portion 47 carrying a bracket 48 on which the die member 12 is mounted. In the mounting just described for the die member 12, it will be noted that this member is located in alignment with the working space 29 of the auxiliary frame 11 and that the die member is vertically movable to and from a working position in which it is disposed in the working space and between the pairs of fixed gear sectors 34, 35 and 37, 38. Figs. 2 and 3 of the drawings show the die member 12 in its lowered position to which it has been retracted from the working space 29 and Fig. 4 shows the die member in an elevated position in which it is disposed in the working space.

For actuating the die member 12 the main frame 10 is provided with a double acting stationary power cylinder 50, preferably hydraulic, which operates to lift and lower the die slide 44. The cylinder 50 extends in upright relation and is supported in this position by having its lower end resting on the base 18 of the main frame. The die slide 44 has a cross-bar 51 thereon with which the shouldered upper end of the piston rod 52 of the cylinder 50 is connected. When pressure fluid is supplied to the lower end of the cylinder 50, it actuates the piston thereof in an upward direction causing the piston rod 52 to lift the die slide on the guide members 20a and 20b to thereby move the die member 12 into the working space 29. Pressure fluid supplied to the other end of the cylinder 50 causes a lowering of the die slide 44 and the die member 12. In the arrangement here shown the shelf portion 47 of the die slide 44 has openings 53 therein through which the cylinder 50 extends and which permit movement of the die slide along the cylinder.

Die member

The die member 12 can be of any appropriate shape depending upon the desired shape to which the workpiece 17 is to be formed. In this instance the die member has a transverse convex curvature, as shown in Fig. 3 and which may extend for the full length thereof, and is also convexly bowed in a longitudinal direction as shown in Fig. 2 so as to have curved anvil portions 54 and 55 at the sides thereof. This die member can be of any appropriate construction such as that here shown in which it is composed of complemental sections bolted or otherwise secured to the bracket 48. It is important to note that the transverse curvaure of the die member 12 is different from the preformed transverse curvature of the workpiece 17, and preferably, the transverse curvature of the die member is shallower and wider than the transverse curvature of the workpiece. As will be explained more fully hereinafter, the workpiece 17 is shaped against the die member 12 by a combined stretching and bending operation during which the end portions of the workpiece are bent around the curved anvil portions 54 and 55 of the die member. During this shaping operation the workpiece is subjected to tension and is stretched longitudinally and against the die member 12 causing the transverse cross-sectional shape of the workpiece to be changed to the transverse curvature of the die member.

Rocker members

Figure 11:
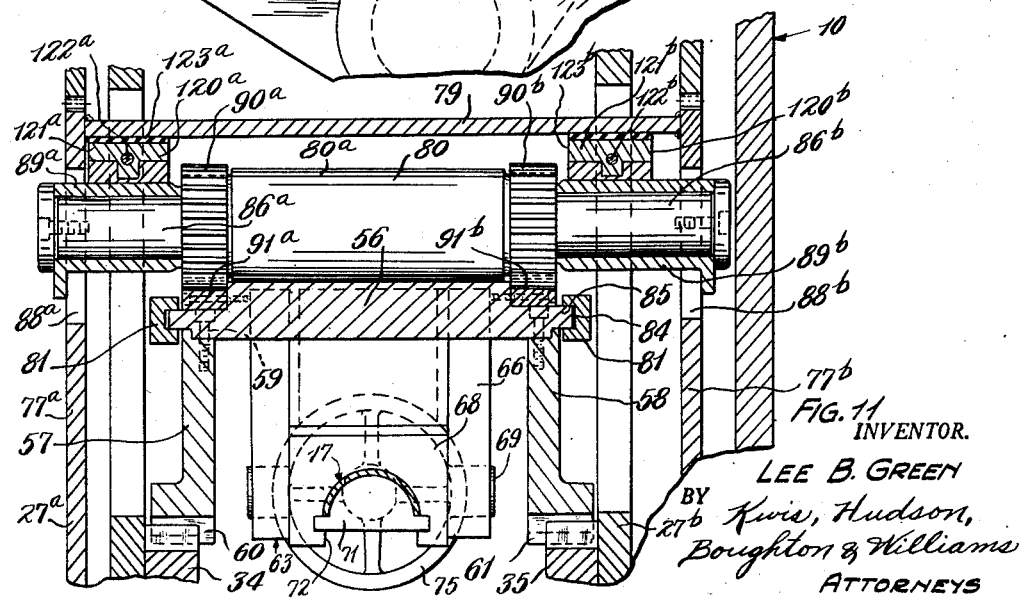
Fig. 11 represents a portion of the vertical sectional view of Fig. 3 showing the same on a larger scale so as to further illustrate the construction of one of the wings and its associated rocker member.

The shaping of the workpiece 17 against the die member 12 is accomplished by means of the rocker members 13 and 14 which are actuated by the wings 15 and 16 and are made to travel around the curved anvil portions 54 and 55 of the die member. The rocker members 13 and 14 are of a similar construction and likewise the wings 15 and 16 are of a similar construction. Each of the rocker members comprises a plate or backing member 56 (see Figs. 3, 4 and 11) and a pair of side members 57 and 58 which are connected with the plate as by means of the screws 59 and cooperate with the plate in defining a channel-like cross-sectional shape adapted to straddle one of the anvil portions of the die member 12. The side members 57 and 58 are provided at their lower edges with racks 60 and 61 which, in the case of the rocker member 13, mesh with and are rockable on the fixed gear sectors 34 and 35. In the case of the rocker member 14 the racks 60 and 61 mesh with and rock on the gear sectors 37 and 38.

Gripping device

Figure 6:
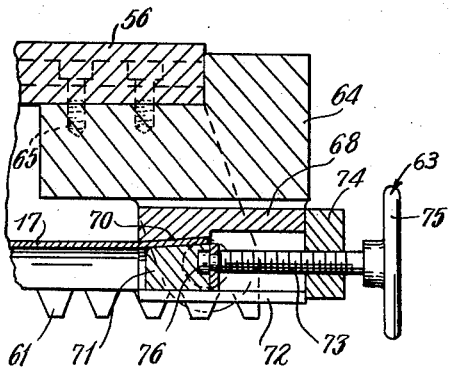
Figs. 6 and 7 are detail views partially in section illustrating one of the work-gripping chucks.
Figure 7:
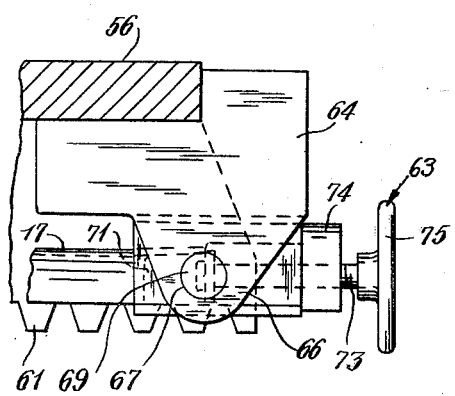
Figure 8:
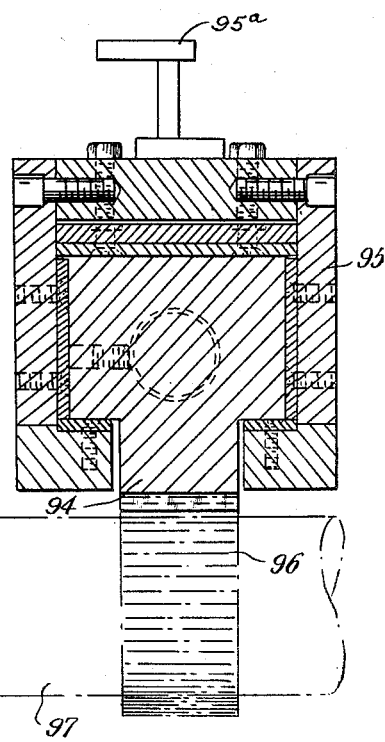
Fig. 8 is a sectional detail view taken transversely of one of the wing actuating racks as indicated by line 8—8 of Fig. 4.
Figure 9:
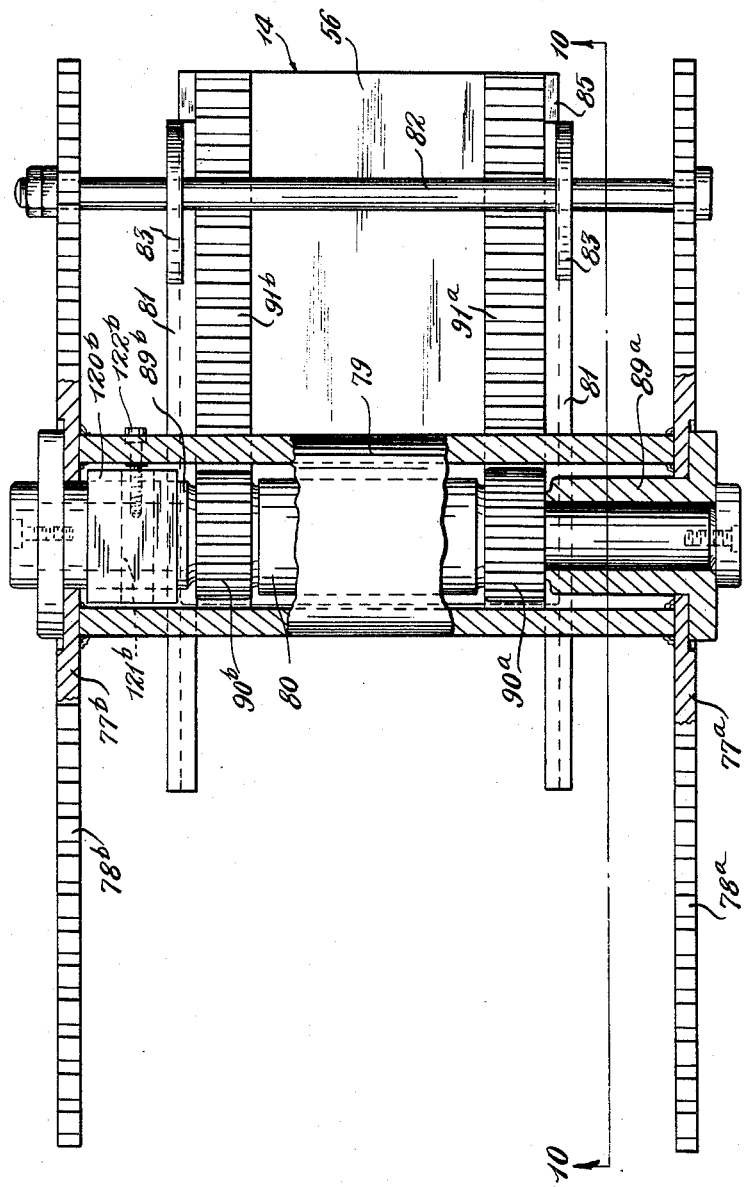
Fig. 9 is a plan view, with portions in section, showing a wing and its associated rocker member detached from the machine for clearer illustration.

Each of the rocker members 13 and 14 carries a work-gripping device or chuck 63 as shown in Figs. 2 and 4. These gripping devices are adapted to clampingly engage the tapered end portions 17a of the workpiece 17 so as to initially support the workpiece in the working space 29 and to subsequently apply a stretching force to the workpiece during the actuation of the rocker members. Each of the gripping devices 63 comprises a head or bracket 64 (see Figs. 6 and 7) which is secured to the backing plate 56 of one of the rocker members as by means of screws 65. The head 64 has a pair of depending lugs or ears 66 thereon which are provided with laterally aligned openings 67. The device 63 also includes a body member 68 disposed between the ears 66 and rockably mounted thereon by means of trunnions 69 journaled in the openings 67.

The body member 68 of the gripping device 63 has a concavely curved jaw portion 70 therein which is tapered to conform to the shape of the end portion 17b of the workpiece 17. The device 63 also includes a tapered plug member 71 (also see Fig. 11) which is movable into the jaw portion 70 and cooperates therewith for clampingly engaging the tapered end portion 17a of the workpiece. The plug 71 is supported and guided by a pair of inwardly extending guide flanges 72 carried by the body member 68 and is actuated by means of a screw 73. The screw 73 extends through a threaded opening of a block 74 which is carried by the body member 68 and is adapted to be rotated by means of a handwheel or knob 75 fixed on the outer end of the screw. The inner end of the screw is provided with a head 76 which is rotatably retained in a recess of the plug member 71. The pivotal mounting formed by the trunnions 69 affords a limited rocking movement which enables the gripping device to accommodate itself to the position of the workpiece and facilitates the operation of inserting the end portion of the workpiece into gripping position.

Swinging wings

Figure 10:
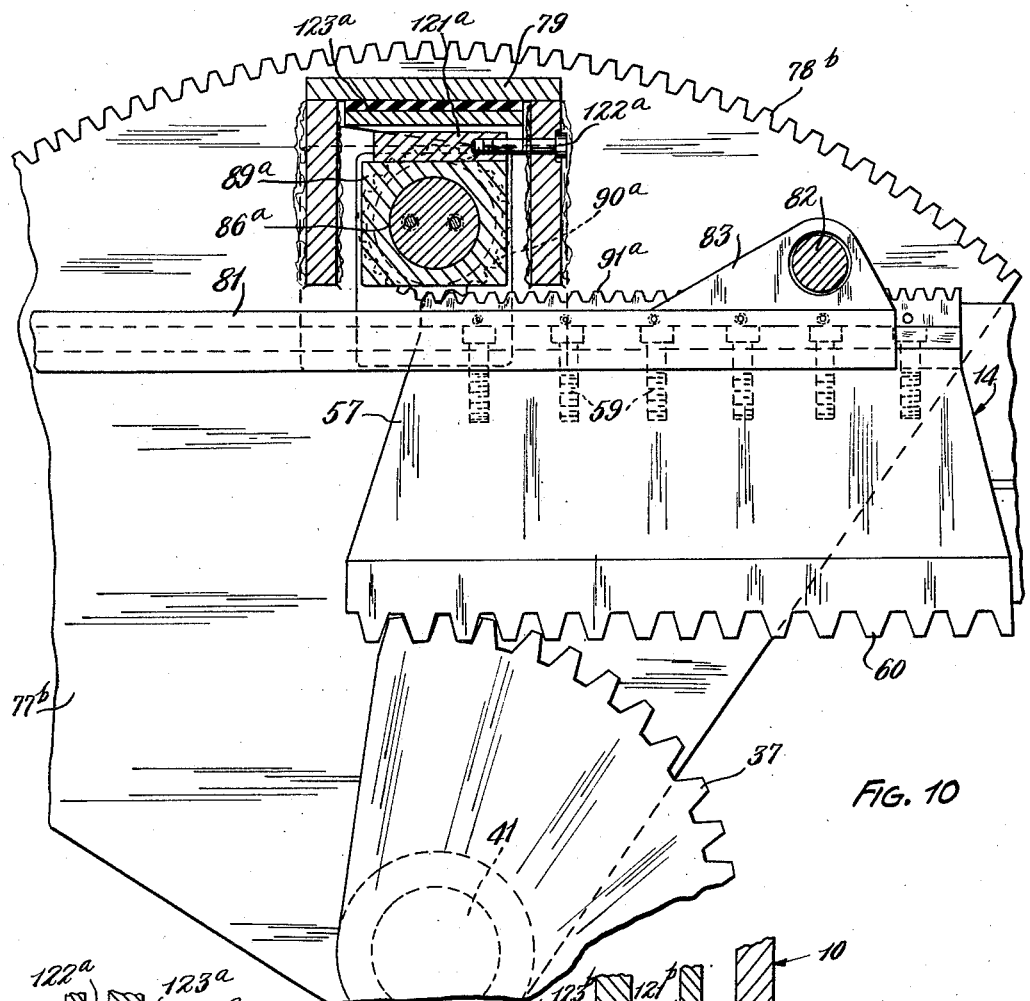
Fig. 10 is a fragmentary sectional view taken relative to a wing and its associated rocker member as indicated by line 10—10 of Fig. 9.

Each of the wings 15 and 16 comprises a substantially U-shaped frame or structure having front and back walls 77a and 77b which are located outwardly of the parallel walls of the frame sections 27 and 28 and are formed by the web portions of a pair of gear sectors 78a and 78b. This U-shaped structure also includes a hollow member 79 (see Figs. 2, 4 and 10) of box-like cross-sectional shape which connects the front and back walls 77a and 77b and houses a pressure roller 80. The wing 15 is mounted for swinging movement on the auxiliary frame section 27 by having its front and back walls journaled on the pivot members 39 and 40. The wing 16 is likewise mounted for swinging movement on the auxiliary frame section 28 by having its front and back walls journaled on the pivot members 41 and 42. During this swinging movement the transverse connecting portions 79 of the wings are accommodated by and traverse the arcuate recesses 32 and 33 of the frame sections 27 and 28. As shown in the drawings (see Figs. 1, 2, 4, 19 and 20), the paired gear sectors 78a and 78b of the wing 15 extend into overlapping relation with the corresponding paired gear sectors 78a and 78b of the wing 16 when the wings are in their initial position.

As mentioned above the wings 15 and 16 actuate the rocker members 13 and 14 and for this purpose an appropriate operating connection between the wings and rocker members is provided. In this instance this operating connection is formed by the pressure rollers 80 and by guide devices which will be described next. The guide device of each wing comprises a pair of channel-shaped substantially parallel guide rails 81 (see Figs. 4, 9, 10 and 11) which are pivotally connected with the wing by means of a bar 82 which extends transversely between the front and back walls 77a and 77b of the wing and has its ends mounted in these walls. The guide rails 81 are pivotally mounted on the bar 82 by means of the ears or brackets 83 having openings through which the bar extends. The guide rails 81 have longitudinal guideways 84 therein in which longitudinal guide projections 85 of the plate 56 of the rocker member slidably engage. The guide rails 81 are thus supported by the transverse bar 82 and by the guide projections 85 of the rocker member 13 or 14. The pairs of these guide rails serve to guide and position the rocker members 13 and 14 during their rocking movement on the gear sectors 34, 35 and 37, 38, that is to say, during their travel around the curved anvil portions 54 and 55 of the die member 12.

The pressure rollers 80 are disposed in the transverse box portions 79 of the wings as mentioned above and each of these rollers has shaft portions 86a and 86b (see Fig. 11) projecting from opposite ends thereof and which extend through slots 88a and 88b of the front and rear walls 77a and 77b of the wing. Bearing members 89a and 89b are shiftable in the slots 88a and 88b and have the shaft projections 86a and 86b of the pressure roller journaled therein. The intermediate portion 80a of the pressure roller is cylindrical and smooth-surfaced for rolling engagement with the top or face of the plate 56 of the rocker member. At the ends of the intermediate portion 80a the roller 80 is provided with pinions 90a and 90b which mesh with racks 91a and 91b which are fixed on the plate 56 adjacent the guide projections 85 thereof.

From the construction and relative arrangement for the wings 15 and 16 and their associated rocker members 13 and 14 as described above, it will be seen that the pressure rollers 80 of the wings bear against the upper faces of the plates 56 of the rocker members so as to maintain the racks 60 and 61 of the latter in mesh with the pairs of fixed gear sectors 34, 35 and 37, 38. As the wings swing about their pivot members 39, 40 and 41, 42 the rollers 80 will roll along the plates 56 and in addition to maintaining the racks of the rocker member in mesh with the gear sectors, they will cause the rocker members 13 and 14 to be rocked on their gear sectors and to travel around the curved anvil portions 54 and 55 of the die member 12 in straddling relation to these curved anvil portions. During this swinging of the wings the pair of guide rails 81 move with the wings since they are pivotally mounted on the transverse bars 82 of the latter but can assume different angular positions corresponding with the different positions assumed by the plates 56 during the rocking of the rocker members around the fixed gear sectors.

*Actuating means for wings*

The swinging movement can be imparted to the wings 15 and 16 by any suitable power means such as the double acting hydraulic cylinders 92 and 93 (see Figs. 2, 3, 4 and 20) which are mounted on the auxiliary frame 11 in substantially horizontally extending relation. The driving connection to the wings from the hydraulic cylinders 92 and 93 is established by providing each cylinder with a rack 94 which is connected with the piston rod of the cylinder and is guided for longitudinal movement in a guide box 95. Each of the cylinders 92 and 93 with its associated and longitudinally aligned guide box 95 is constructed as a unit which is reinforced by a longitudinal stiffening rib 95a provided on the top thereof. As shown in Fig. 20, the cylinder unit comprising the cylinder 92 and its guide box 95 is mounted on the rear wall of the frame section 27 by screws 95b engaging the guide box of this unit and with the cylinder 92 thereof extending into overlapping relation to the frame section 28. The cylinder unit formed by the cylinder 93 and its guide box 95 is mounted on the front wall of the frame section 28 by screws 95c engaging the guide box of this unit and with the cylinder 93 thereof extending into overlapping relation to the frame section 27.

The racks 94 mesh with pinions 96 which are fixed to shafts 97. The shafts 97 are journaled in the frame sections 27 and 28 so that their ends extend through the front and rear walls thereof. A pair of gears 98 are mounted on the ends of each shaft so as to lie outside of the front and rear walls of the corresponding frame section. The gears 98 mesh with idler gears 99 which are rotatably supported by the front and rear walls of the frame sections 27 and 28 and which, in turn, mesh with the gear sectors 78a and 78b of the wings 15 and 16.

From the construction of this bending machine as thus far described, it will be observed that the gear sectors 34 and 35 and the pivot members 39 and 40 on which the rocker member 13 and the wing 15 are mounted respectively, are carried by the frame section 27. The rocker member 14 and the wing 16 are similarly mounted on the frame section 28 by means of the gear sectors 37 and 38 and the pivot members 41 and 42. As further explained hereinafter, the frame sections 27 and 28 are laterally adjustable on the main frame 10 so that the wings and rocker members will be appropriately located, as to lateral spacing, for the particular length of workpiece to be operated upon. In the drawings the frame sections 27 and 28 are at their closest position of adjustment which is suitable for the workpiece 17 but when a workpiece of greater length is to be subjected to the bending operation, the sections are spread apart to a laterally spaced relationship in which the pairs of gear sectors and pairs of pivot members will also be spaced apart laterally of the machine a greater distance than the spacing shown in Figs. 2 and 4. It will be understood of course that for operation on such longer workpiece a correspondingly longer die member would be substituted in the machine for the die member 12 so that the curved anvil portions 54 and 55 will be suitably located with respect to the wings 15 and 16 and their associated rocker members 13 and 14.

Adjustment for frame sections

The adjusting of the frame sections 27 and 28 to positions corresponding with lateral spacings required for different lengths of workpiece is permitted by the above described dove-tail mounting of the frame sections on the upper portion of the main frame 10. The spreading or closing of the frame sections 27 and 28 to the desired adjustment can be accomplished by suitable adjusting means such as the adjusting screw 106 provided at the top of the machine and which has right and left-hand thread portions 106a and 106b and is adapted to be rotated by means of the handwheel 107. The screw 106 also has an unthreaded intermediate portion 106c which is rotatably anchored in a bearing bracket 108, the latter being fixed on the upper portion of the main frame 10 as by means of the screws 108a. The screw 106 is also rotatably supported adjacent the ends thereof by having unthreaded portions journalled in bearing brackets 109 and 112 which are anchored on the main frame 10 by suitable screws. The screw portions 106a and 106b extend through and cooperate with correspondingly threaded brackets 110 and 111 respectively which are connected with the frame sections 27 and 28.

When the screw 106 is rotated in one direction its oppositely threaded portions 106a and 106b will cause the brackets 110 and 111 to travel therealong and impart an outward or spreading movement to the frame sections 27 and 28 and rotation of the screw in the other direction will cause an inward or closing movement of the frame sections. During such adjusting movement of these frame sections, they will of course carry and shift the corresponding wing and rocker member assemblies and the cylinder units which include the power cylinders 92 and 93 since these various devices and mounted on these frame sections as explained above. The extent to which the frame sections are thus adjusted will be determined by the length of the workpiece to be shaped and will be such as to locate the rocker members 13 and 14 for proper cooperation with the anvil portions 54 and 55 of the die member 12.

When the frame sections 27 and 28 have been laterally adjusted in this manner to the desired position they are rigidly locked together by connecting strips or inserts 113 and 114 which are bolted to the adjacent portions of the walls of the frame sections so as to span the joints therebetween. These inserts will vary in width according to the different spacings to which the frame sections 27 and 28 are adjusted. When the frame sections are in their closest position of adjustment, as shown in the drawings, these inserts are relatively narrow and can be in the form of the T-bars shown in this instance.

Aligning means for die and auxiliary frame

From Fig. 3 of the drawings it will be observed that the auxiliary frame 11 formed by the frame sections 27 and 28 extends forwardly from the main frame 10 in overhanging relation to the die slide 47 and the die member 12 carried thereby. Because of this overhanging relation for the auxiliary frame 11 it is desirable to reinforce the machine so as to prevent relative lateral shifting between the auxiliary frame and the die member 12 which might otherwise result in inaccuracy in the work or in twisting strains being developed in the main frame 10. For this purpose the front walls of the auxiliary frame 11 are provided with a socket member 116 (see Figs. 1, 4, 12 and 13) which is rigidly mounted thereon, as by being welded or otherwise connected to the lower end of the front insert 113, and the die slide 47 is provided with a projection or pin 117 which is aligned with and engageable in such socket member. The socket member 116 may have a bushing or lining 116a (see Fig. 15) therein of appropriate size for snugly receiving the pin 117 and which can be removed and renewed from time to time as wear occurs. The pin 117 is carried by an arm or bracket 118 which is attached to the die slide 47. When the die slide is moved upwardly by the operation of the cylinder 50 to position the die member 12 in the working space 29, the pin 117 will engage in the bushing of the socket member 116 and the front portion of the auxiliary frame 11 will then be relatively rigidly connected with the die slide 47 so that no relative lateral shifting can take place between the auxiliary frame and the die member 12 and this will result in the die member being maintained in proper relation to the rocker members 13 and 14 during the bending operation.

Radial adjustment of pressure rollers

Reverting to the pressure rollers 80 which are carried by the wings 15 and 16 and cooperate with the rocker members 13 and 14, it should be explained that these rollers are mounted in the wings so as to be capable of limited shifting in a radial direction relative to the pivot members of the wings so that they can be maintained in operative engagement with the plates 56 of the rocker members during the bending operation. This relative shifting is permitted by having the bearing members 89a and 89b movably mounted in the slots 88a and 88b of the wings and by providing the bearing members with adjustable backing members or thrust blocks 120a and 120b (see Figs. 9 and 11). These thrust blocks include wedge-shaped sections 121a and 121b which are shiftable by means of the adjusting screws 122a and 122b, each mounted in the inner wall of hollow member 79, for causing the radial positioning of the roller 80. For absorbing noise and vibration and providing limited flexibility for the positioning of the roller 80 it may be desirable to employ yieldable cushions or inserts 123a and 123b formed of resilient rubber or the like in back of the adjustable thrust blocks 120a and 120b.

Stretching and bending operation

In the operation of the above described bending machine the die member 12 is initially in its lowered or opened position as shown in Figs. 2 and 3 and the pair of wings 15 and 16 and associated rocker members 13 and 14 are likewise in an initial position as shown in Fig. 2. While these working parts of the machine are in this position the preformed workpiece 17 is placed in the machine in the laterally extending position shown in Fig. 2 in which it extends in the working space 29 transversely of the machine and above the die member 12. The workpiece is held in this position by reason of the fact that its flared end portions 17a are gripped by the gripping devices 63 of the rocker members 13 and 14.

When the workpiece 17 has been mounted in the machine in the position just described above, the operation of the machine is started causing an initial upward or closing movement of the die member by the power cylinder 50. During this initial closing movement of the die member 12 the wings 15 and 16 remain stationary but when the die member reaches a work-engaging position, represented by the construction line 124 of Fig. 2, the actuation of the wings 15 and 16 by the power cylinder 92 and 93 is started causing the wings to swing outwardly and downwardly about their pivot members 39, 40 and 41, 42. This swinging of the wings also causes an outward or downward rocking of the rocker members 13 and 14 on their pairs of fixed gear sectors 34, 35 and 37, 38. The upward movement of the die member 12 is continued from its work-engaging position, represented by the line 124, to the full line position in which it is shown in Fig. 4. During this upward movement or working stroke of the die member it pushes upwardly against the workpiece 17 and since the ends of the workpiece are then held by the gripping devices 63 the workpiece will be subjected to an initial tensioning or stretching by being deflected upwardly to the position shown in Fig. 4.

During the upward working travel of the die member 12 from the position 124 of Fig. 2 to the full line position shown in Fig. 4, the wings 15 and 16 and their associated rocker members 13 and 14 will have moved from their horizontal position of Fig. 2 to the inclined full line position shown in Fig. 4. The position of the die member shown in Fig. 4 represents its final or extreme upward position and when it has reached this position its upward movement ceases. The outward and downward swinging of the wings 15 and 16 is then continued and causes a further outward and downward rocking of the rocker members 13 and 14 until these members reach an extreme lower position corresponding with the broken line showing of the rocker member 14 in Fig. 4. During this continued rocking movement of the rocker members 13 and 14 the workpiece 17 is subjected to stretching between the gripping device 63 and against and around the die member 12 and to a simultaneous bending of the end portions of the workpiece around the curved anvil portions 54 and 55 of the die member.

During this stretching and bending operation the transverse curvature of the workpiece is also changed so as to conform to and fit snugly against the transverse curvature of the die member 12. It will be observed also from the drawings that during the outward and downward swinging of the wings 15 and 16 the pressure rollers 80 thereof will travel along the backs of the plates 56 of the rocker members 13 and 14 thereby causing the rocker members to rock upon and around the fixed gear sectors 34, 35 and 37, 38. The meshing engagement of the racks 60 and 61 of the rocker members with the fixed gear sectors during such rocking movement causes the gripping devices 63 to apply the pulling or stretching force to the ends of the workpiece 17. During this stretching and bending operation the workpiece is accurately shaped to conform smoothly with the contour of the working surface of the die member 12 and the forming of the workpiece to the curved shape in this manner is accomplished without wrinkling or buckling of the material and with the material assuming a permanent set in the formed condition so that there will be no appreciable amount of spring-back when the workpiece is removed from the machine.

The amount of stretching to which the workpiece is subjected can be varied to suit the requirements of the particular job and the characteristics of the metal of the workpiece being worked. Usually, however, the elongation produced in the workpiece is equal to or greater than the combined length of the tapered end portions 17a of the preformed workpiece so that when these tapered end sections are cut from the finished workpiece as scrap material the elongation will compensate for this amount of scrap material. It should also be mentioned that during the stretching and bending operation carried out by this machine the workpiece is not clamped against the die member other than by the tensional force acting to press the same thereagainst and hence the elongation can distribute itself substantially uniformly throughout the length of the workpiece and no localized weakened spots will be produced therein.

Upon the completion of the stretching and bending operation above described the gripping devices 63 are actuated to release the ends of the completed workpiece and the wings 15 and 16 are then swung upwardly and inwardly to their retracted or initial position shown in Fig. 2. The die member 12 with the released workpiece resting thereon is then retracted from the working space 29 by lowering the die slide 47. As the die member approaches or reaches its initial or lowermost position the workpiece is removed and a new workpiece is inserted in the machine for another cycle of operation.

Oil under pressure, or other suitable motive fluid, is supplied to the power cylinders 50, 92 and 93 for producing the above described actuation of the die member and wings and such pressure motive fluid can be obtained from any available source. In this instance the machine is provided with suitable pumps 125 which are driven by electric motors 126 and operate to supply such pressure fluid to the power cylinders from the reservoir 25.

*Modified gripping devices*

Fig. 17 of the drawings shows a modified work gripping device 130 which can be mounted on the rocker members 13 and 14 in place of the gripping devices 63. The modified gripping device 130 differs from the gripping device 63 in that the plug member 131 is actuated by the piston 132 of a hydraulic cylinder 133. The cylinder 133 can be mounted in fixed relation on the rocker member 134 by means of the block 135 and the bracket 136. The cylinder 133 is preferably a double acting cylinder with which pressure fluid connections are made through the flexible conduits 137 and 138.

Fig. 18 of the drawings shows another modified form of gripping device adapted to be used on the rocker members 13 and 14 in place of the gripping device 63. This gripping device is also provided with a power cylinder 140 for actuating the plug member 141 but in this case the power cylinder and the chuck of which the plug member 141 forms a part are carried by a pivoted bracket 142. The bracket 142 is supported by a block 143 which is fixed to the rocker member 144 and is pivotally mounted in this block by means of the trunnions 145. The bracket 142 has limited movement relative to the block 143 as permitted by the space 146 therebetween and by the cushioning spring 147. This spring is mounted on a rod 148 which is carried by the block 143 and extends through an opening 149 of the bracket. The spring 147 preferably has a load characteristic such that it will counterbalance the weight of the projecting cylinder 140. Flexible conduits 150 and 151 provide the pressure fluid connections for this cylinder.

From the foregoing description and the accompanying drawings it will now be readily understood that this invention provides an improved machine which is capable of efficiently and accurately carrying out a desired shaping or forming operation on a workpiece during which the workpiece is subjected to a combined stretching and bending. Moreover, it will be seen that this machine is well suited to operate on workpieces of the type having an initial transverse curvature or channel-shaped cross-section and that the bending and shaping of workpieces of this kind will be carried out without buckling or wrinkling of the material and substantially without any spring-back when the workpiece is released from the machine. Furthermore the elongation produced in the workpiece is distributed substantially uniformly therealong and compensates for the scrap material which must be trimmed from the ends of the workpiece.

Although the improved bending machine has been illustrated and described herein in considerable detail, it will be understood of course that this invention is not to be regarded as being correspondingly limited but includes all changes and modifications coming within the scope of the claims hereof.

Having thus described my invention, I claim:

1. In a bending machine of the character described, a frame, a die member supported by said frame and having curved anvil portions at the sides thereof, pivot means on said frame, a pair of wings mounted on said pivot means for swinging around said curved anvil portions, gear sectors mounted on said frame adjacent said pivot means, a pair of rocker plates adapted for movement around said curved anvil portions and having side members provided with rack elements which mesh with said gear sectors and are rockable thereon, means connecting said rocker plates with said wings for actuation thereby comprising connecting devices pivoted on said wings and having sliding cooperation with said rocker plates, means for causing swinging of said wings for imparting said movement to said rocker plates, and gripping devices mounted on said rocker plates and adapted to grip opposite ends of a workpiece for stretching and bending the workpiece around said curved anvil portions, said side members being of a depth to hold said rocker plates spaced away from said curved anvil portions a distance substantially greater than the thickness of said workpiece.

2. In a bending machine of the character described, a frame, a die member supported by said frame and having curved anvil portions at the sides thereof, pivot means on said frame, a pair of wings mounted on said pivot means for swinging around said curved anvil portions, gear sectors mounted on said frame adjacent said pivot means, a pair of rocker plates adapted for movement around said curved anvil portions and having side members provided with rack elements which mesh with said gear sectors and are rockable thereon, means connecting said rocker plates with said wings for actuation thereby comprising connecting devices pivoted on said wings and having sliding cooperation with said rocker plates, gripping devices on said rocker plates and adapted to grip opposite ends of a workpiece, said side members being of a depth to hold said rocker plates spaced away from said curved anvil portions a distance substantially greater than the thickness of said workpiece, pressure rollers carried by said wings and bearing on said rocker plates, said rollers acting to retain said rack elements in mesh with said gear sectors, and power mechanism on said frame operable to swing said wings for imparting said movement to said rocker plates for causing stretching and bending of the workpiece around said curved anvil portions.

3. In a bending machine of the character described, a frame, a die member supported by said frame and having curved anvil portions at the sides thereof, pivot means on said frame, a pair of wings mounted on said pivot means for swinging around said curved anvil portions, gear sectors mounted on said frame adjacent said pivot means, channel-like rocker members adapted to travel around said curved anvil portions in straddling relation thereto, said rocker members comprising a back element and a pair of substantially parallel sides connected to said back element and provided with racks which mesh with and rock on said gear sectors, gripping devices carried by said rocker members and adapted to grip opposite ends of an elongated workpiece, said sides being of a depth to hold the back elements of said rocker members spaced away from said curved anvil portions a distance substantially greater than the thickness of said workpiece, said wings including transverse hollow members having an open side facing toward the back elements of said rocker members, rollers carried by said wings and located in said transverse hollow members, said rollers being in engagement with said back elements and acting to hold said racks in mesh with said gear sectors, power mechanism on said frame operable to cause swinging of said wings, and means operably connecting said rocker members with said wings to be actuated by the latter for causing simultaneous stretching and bending of said workpiece around said anvil portions including connecting devices pivoted on said wings and having paired guideways slidably engaged by said rocker members.

4. A bending machine as defined in claim 1 in which said gripping devices are pivotally mounted on said rocker plates between the parallel side members thereof.

5. In a metal bending machine, a frame having substantially parallel walls with a working space therebetween, a die member adapted to be positioned in said working space and having curved anvil portions at opposite sides thereof, pivot means on said walls, a pair of wings mounted on said pivot means for swinging movement, a pair of rocker members located in said working space and adapted to be actuated by said wings so as to travel around said curved anvil portions, gripping devices carried by said rocker members and adapted to grip opposite ends of an elongated workpiece and enabling the rocker members to cause stretching and bending of the workpiece around said anvil portions, and driving means for imparting swinging movement to said wings.

6. In a metal bending machine, a frame having substantially parallel walls with a working space therebetween, a die member adapted to be positioned in said working space and having curved anvil portions at opposite sides thereof, pivot means on said walls, gear sectors on said walls adjacent said pivot means, a pair of wings mounted on said pivot means for swinging movement, a pair of rocker members located in said working space and adapted to be actuated by said wings so as to travel around said curved anvil portions, said rocker members having racks thereon which mesh with and rock on said gear sectors, gripping devices carried by said rocker members and adapted to grip opposite ends of an elongated workpiece and enabling the rocker members to cause stretching and bending of the workpiece around said anvil portions, other gear sectors carried by said wings, and power means for swinging said wings including driving gears meshing with said other gear sectors.

7. In a metal bending machine, a frame having substantially parallel walls with a working space therebetween, a die member adapted to be positioned in said working space and having curved anvil portions at opposite sides thereof, pivot means on said walls, gear sectors mounted on the inside of said walls and adjacent said pivot means, a pair of wings mounted on said pivot means for swinging movement, substantially channel-shaped rocker members located in said working space and adapted to travel around said curved anvil portions in straddling relation thereto, said rocker members being adapted for actuation by said wings and having rack elements thereon which mesh with and rock on said gear sectors, gripping devices carried by said rocker members and adapted to grip opposite ends of an elongated workpiece and enabling the rocker members to cause stretching and bending of the workpiece around said anvil portions, and power means for imparting the swinging movement to said wings.

8. In a metal bending machine, a frame having substantially parallel walls with a working space therebetween, a die member adapted to be positioned in said working space and having curved anvil portions at opposite sides thereof, pivot means on the remote sides of said walls, gear sectors adjacent said pivot means but mounted on the inside of said walls, said walls having recesses extending thereinto from their edges and located adjacent said gear sectors, wings mounted for swinging on said pivot means and including transverse portions movable in said recesses, rocker members located in said working space and adapted to travel around said curved anvil portions, said rocker members having operative connection with the transverse portions of said wings for actuation thereby and being provided with racks which mesh with and rock on said gear sectors, gripping devices carried by said rocker members and adapted to grip opposite ends of an elongated workpiece and enabling the rocker members to cause stretching and bending of the workpiece around said anvil portions, and power means for imparting the swinging movement to said wings.

9. A bending machine as defined in claim 5 in which the wings include gear sectors movable along the outside of said parallel walls and the driving means for the wings includes toothed driving elements in mesh with the last-mentioned gear sectors.

10. In a metal bending machine, a frame having substantially parallel walls with a working space therebetween, a die member having curved anvil portions at opposite sides thereof, means mounting said die member on said frame for movement into and out of said working space to and from a work-engaging position, means for causing such actuation of said die member, pivot means mounted on said walls, gear sectors mounted on said walls adjacent said pivot means, wings mounted on said pivot means for swinging movement and including transverse portions movable in recesses provided in said walls, rocker members located in said working space and adapted to travel around said curved anvil portions, said rocker members having operative connection with the transverse portions of said wings for actuation thereby and being provided with racks which mesh with and rock on said gear sectors, gripping devices carried by said rocker members and adapted to grip opposite ends of an elongated workpiece and enabling the rocker members to cause stretching and bending of the workpiece around said anvil portions, and power means for imparting the swinging movement to said wings.

11. In a metal bending machine, a frame having substantially parallel walls with a working space therebetween, a die member adapted to be positioned in said working space and having curved anvil portions at opposite sides thereof, pivot means on said walls, gear sectors on said walls adjacent said pivot means, a pair of wings mounted on said pivot means for swinging movement, a pair of rocker members located in said working space and adapted to travel around said curved anvil portions, gripping devices carried by said rocker members and adapted to grip opposite ends of an elongated workpiece and enabling the rocker members to cause stretching and bending of the workpiece around said curved anvil portions, said rocker members having racks thereon which mesh with and rock on said gear sectors, other gear sectors carried by said wings, connecting means connecting said rocker members with said wings for actuation thereby and providing a pivotal and sliding connection between each wing and its associated rocker member, and power means for swinging said wings including driving gears meshing with said other gear sectors.

12. In a metal bending machine, a frame having substantially parallel walls with a working space therebetween, a die member adapted to be positioned in said working space and having curved anvil portions at opposite sides thereof, pivot means on said walls, gear sectors mounted on the inside of said walls and adjacent said pivot means, a pair of wings mounted on said pivot means for swinging movement, substantially channel-shaped rocker members located in said working space and adapted to travel around said curved anvil portions in straddling relation thereto, gripping devices carried by said rocker members and adapted to grip opposite ends of an elongated workpiece and enabling the rocker members to cause stretching and bending of the workpiece around said curved anvil portions, said rocker members having rack elements thereon which mesh with and rock on said gear sectors, connecting means connecting said rocker members with said wings for actuation thereby and comprising guide devices pivotally connected with said wings and slidably engaged by said rocker members, and power means for imparting the swinging movement to said wings.

13. In a metal bending machine, a frame having substantially parallel walls with a working space therebetween, a die member adapted to be positioned in said working space and having curved anvil portions at opposite sides thereof, pivot means on the remote sides of said walls, gear sectors adjacent said pivot means but mounted on the inside of said walls, said walls having recesses extending thereinto from their edges and located adjacent said gear sectors, wings mounted for swinging movement on said pivot means and including transverse portions movable in said recesses, rocker members located in said working space and adapted to travel around said curved anvil portions, gripping devices carried by said rocker members and adapted to grip opposite ends of an elongated workpiece and enabling the rocker members to cause stretching and bending of the workpiece around said curved anvil portions, said rocker members having operative connection with the transverse portions of said wings for actuation thereby and being provided with racks which mesh with and rock on said gear sectors, said transverse portions comprising pivot members carried by said wings, paired guide members connected with said wings through said pivot members and having guideways slidably engaged by said rocker members, and power means for imparting the swinging movement to said wings.

14. In a metal bending machine, a frame having substantially parallel walls with a working space therebetween, a die member adapted to be positioned in said working space and having curved anvil portions at opposite sides thereof, pivot means on the remote sides of said walls, gear sectors adjacent said pivot means but mounted on the inside of said walls, said walls having recesses extending thereinto from their edges and located adjacent said gear sectors, wings mounted for swinging movement on said pivot means and including transverse portions movable in said recesses, rocker plates located in said working space and adapted to travel around said curved anvil portions, gripping devices carried by said rocker plates and adapted to grip opposite ends of an elongated workpiece and enabling said rocker members to cause stretching and bending of the workpiece around said curved anvil portions, said rocker plates having operative connection with certain of the transverse portions of said wings for actuation thereby and being provided with side members having racks thereon which mesh with and rock on said gear sectors, said transverse portions comprising pivot members carried by said wings and hollow members also carried by said wings and having an open side facing toward said rocker plates, rollers carried by said wings and located in said hollow members, said rollers being in engagement with said rocker plates through the open sides of said hollow members and acting to hold said racks in mesh with said gear sectors, power mechanism operable to cause swinging of said wings, and paired guide members connected with said wings through said pivot members and having guideways slidably engaged by said rocker plates.

15. In a bending machine of the character described, a frame having a pair of substantially parallel front and back walls with a working space therebetween, said walls having recesses extending thereinto from the edges thereof and which recesses comprise pairs of recesses substantially aligned with each other in a direction transversely of said working space, a die member having convexly curved side portions, means forming a mount for said die member and being movable on said frame to position said die member in said working space with said curved side portions lying between the pairs of said recesses, wing structures having paired arms pivoted on said front and back walls for swinging of said wing structures, power mechanism operable to cause swinging of said wing structures, said wing structures having transverse portions extending between said paired arms and adapted to traverse said pairs of recesses during said swinging, rocker members in said working space and rockably mounted on said front and back walls for movement around said curved side portions of said die member, means operably connecting said rocker members with said transverse portions for actuation of said rocker members by said wing structures, and gripping devices carried by said rocker members for engagement with opposite ends of an elongated workpiece and enabling said rocker members to cause simultaneous stretching and bending of said workpiece around said die member.

LEE B. GREEN.

REFERENCES CITED

The following references are of record in the file of this patent:

UNITED STATES PATENTS

| Number | Name | Date |
| --- | --- | --- |
| 152,106 | Hale | June 16, 1874 |
| 957,200 | Gail | May 10, 1910 |
| 1,461,471 | Bancroft | July 10, 1923 |
| 1,710,261 | Kellogg | Apr. 23, 1929 |
| 1,968,010 | Bailey | July 31, 1934 |
| 2,006,468 | Longren | July 2, 1935 |
| 2,128,620 | Lyons | Aug. 30, 1938 |
| 2,190,423 | Henricson | Feb. 13, 1940 |
| 2,269,549 | Oeckl | Jan. 13, 1942 |
| 2,287,933 | Green | June 30, 1942 |
| 2,293,287 | Franz | Aug. 18, 1942 |
| 2,357,027 | Seifried | Aug. 29, 1944 |
| 2,378,413 | Lermont | June 19, 1945 |
| 2,378,482 | Jager | June 19, 1945 |
| 2,382,807 | Nobles | Aug. 14, 1945 |
| 2,428,890 | Peterson | Oct. 14, 1947 |
| 2,431,173 | Hawkes | Nov. 18, 1947 |
| 2,437,105 | Lindsey | Mar. 2, 1948 |
| 2,442,268 | Fields | May 25, 1948 |
| 2,459,132 | Nielsen | Jan. 11, 1949 |

FOREIGN PATENTS

| Number | Country | Date |
| --- | --- | --- |
| 482,769 | Great Britain | Apr. 5, 1938 |
| 517,373 | Germany | Feb. 2, 1931 |

OTHER REFERENCES

Nov. 1945 issue of Aviation, pp. 147, 148, 149.
July 1944 issue of Machinery, pp. 146 to 155.